(12) United States Patent
Chitkara et al.

(10) Patent No.: US 12,061,593 B2
(45) Date of Patent: Aug. 13, 2024

(54) DATABASE MODIFICATION AND PROCESSING SYSTEM

(71) Applicant: SAP SE, Walldorf (DE)

(72) Inventors: Rajnish Chitkara, San Francisco, CA (US); Michael Vander Ploeg, Waterloo (CA); Anita Patel, San Francisco, CA (US); Marlon McKenzie, Waterloo (CA); Abhishek Singhi, Waterloo (CA); Eunsang Kim, Seoul (KR); Hanggjun Cho, Seoul (KR); Juhyeon Jeong, Seoul (KR)

(73) Assignee: SAP SE, Walldorf (DE)

(*) Notice: Subject to any disclaimer, the term of this patent is extended or adjusted under 35 U.S.C. 154(b) by 1138 days.

(21) Appl. No.: 16/250,121

(22) Filed: Jan. 17, 2019

(65) Prior Publication Data

US 2020/0233849 A1 Jul. 23, 2020

(51) Int. Cl.
*G06F 16/23* (2019.01)
*G06F 16/22* (2019.01)
*G06F 21/60* (2013.01)

(52) U.S. Cl.
CPC ........ *G06F 16/2343* (2019.01); *G06F 16/221* (2019.01); *G06F 16/2379* (2019.01); *G06F 21/602* (2013.01)

(58) Field of Classification Search
CPC ............. G06F 16/2343; G06F 16/221; G06F 16/2379; G06F 21/602; G06F 21/6227; G06F 16/283
USPC .......................................................... 707/648
See application file for complete search history.

(56) References Cited

U.S. PATENT DOCUMENTS

| | | | |
|---|---|---|---|
| 6,606,626 B1* | 8/2003 | Ponnekanti | G06F 16/2343 709/203 |
| 9,519,547 B2* | 12/2016 | Devadhar | G06F 16/2343 |
| 2007/0079119 A1* | 4/2007 | Mattsson | H04L 9/0891 713/193 |
| 2008/0033960 A1* | 2/2008 | Banks | G06F 16/242 707/999.009 |

(Continued)

OTHER PUBLICATIONS

SalarianEngineer et al., "Setting flag in original table to processed after copying data", Sep. 5, 2013, downloaded from the Internet, URL: https://stackoverflow.com/questions/18645109/sql-server-setting-flag-in-original-table-to-processed-after-copying-data, pp. 1-3, (Year: 2013).*

(Continued)

*Primary Examiner* — Shahid A Alam
(74) *Attorney, Agent, or Firm* — Sterne, Kessler, Goldstein & Fox P.L.L.C.

(57) ABSTRACT

Disclosed herein are system, method, and computer program product embodiments for database modification and processing functionality. An embodiment operates by providing a batch of values stored in rows corresponding to a particular column responsive to a request to encrypt the values of the particular column. Encrypted values corresponding the batch of values are received and stored in a hidden column. A status of the rows corresponding to batch of values of the hidden column is updated to indicate in which rows of the hidden column the received encrypted values have been stored. Updated encrypted values are received and stored in the hidden column. The particular column is replaced with the hidden column.

20 Claims, 4 Drawing Sheets

(56) References Cited

U.S. PATENT DOCUMENTS

| | | | | |
|---|---|---|---|---|
| 2010/0114841 A1* | 5/2010 | Holenstein | ............ | G06F 16/217 |
| | | | | 707/694 |
| 2012/0246216 A1* | 9/2012 | Hinni | ...................... | H04L 67/01 |
| | | | | 709/202 |
| 2012/0254136 A1* | 10/2012 | Bosson | ............... | G06F 21/6227 |
| | | | | 707/699 |
| 2015/0143112 A1* | 5/2015 | Yavuz | ................. | G06F 21/6227 |
| | | | | 713/165 |
| 2017/0097847 A1* | 4/2017 | Convery | ................. | G06F 9/466 |
| 2018/0137139 A1* | 5/2018 | Bangalore | ........... | G06F 16/2379 |
| 2018/0373887 A1* | 12/2018 | Smith | ................. | G06F 21/6227 |
| 2019/0188309 A1* | 6/2019 | Anderson | ............... | G06F 3/065 |
| 2019/0332389 A1* | 10/2019 | Nadimpalli | ........... | G06F 9/5027 |
| 2020/0034458 A1* | 1/2020 | Mehta | ................. | G06F 16/2255 |

OTHER PUBLICATIONS

Stackoverflow, "Alter Table without locking the table", Jun. 18, 2016, downloaded from the Internet, URL: https://stackoverflow.com/questions/463677/alter-table-without-locking-the-table, pp. 1-11 (Year: 2016).*

Shlomi Noach, "How do I swap tables in MySQL", dated Aug. 2012, downloaded from the Internet on Nov. 21, 2022, pp. 1-2, URL: https://dba.stackexchange.com/questions/22108/how-do-i-swap-tables-in-mysql (Year: 2012).*

* cited by examiner

DATABASE MODIFICATION AND PROCESSING SYSTEM

BACKGROUND

Performing database maintenance often requires that the data of the database is locked until the maintenance operations are complete. While maintaining a database is necessary to ensure ongoing functionality of the database, the need to lock data creates significant processing delays as ongoing operations attempt to read, modify, or otherwise access the locked data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing database modification and processing functionality.

Figure 1:
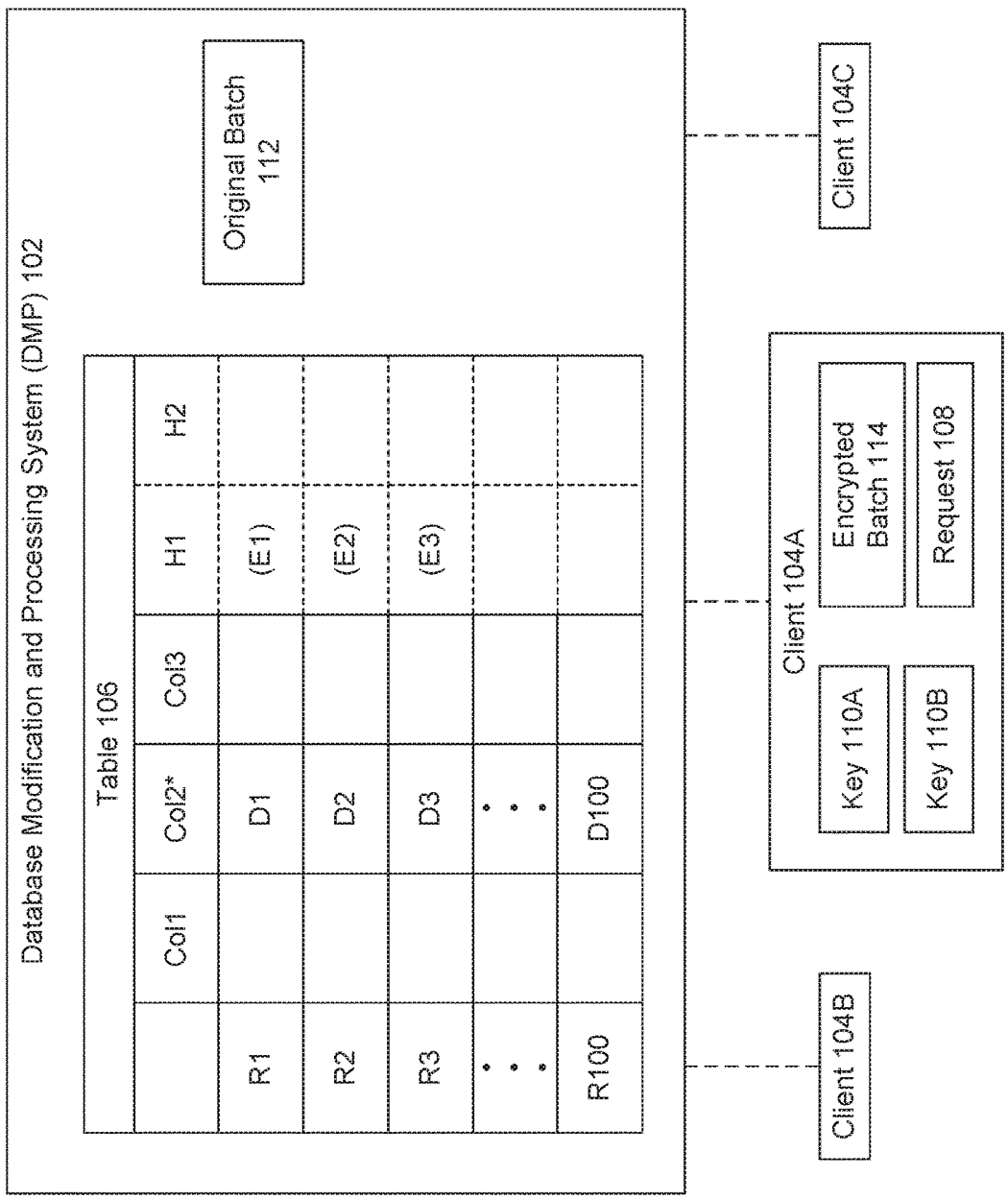
FIG. 1 is a block diagram illustrating example functionality for providing database modification and processing, according to some embodiments.

FIG. 1 is a block diagram 100 illustrating example functionality for providing database modification and processing, according to some embodiments. To maintain the long-term health (e.g., functionality) of a database, the database often needs to be maintained. These maintenance operations often require locking the data that is being affected.

However, locking the data over extended periods of time can create significant processing delays as users and other systems may be trying to access (read, modify, add, delete) the locked data during the locked time. Furthermore, the more data a table stores and that needs to be maintained, the higher the potential that database downtimes may be extended. Also, limited network bandwidth (in client-side encryption and other maintenance operations) may also increase downtimes.

The database modification and processing system (DMP) 102 of FIG. 1 minimizes downtime during database maintenance operations, and improves overall system throughput.

In an embodiment, a database may operate as a service provider. When operating as a service provider, one or more of the maintenance operations may be performed by clients 104 of the database. For example, data from a table 106 may be locked, transferred to client 104A, and maintained by client 104A. After performing maintenance operations, DMP 102 may receive the maintained data and store it in table 106, and unlock the data.

In an embodiment, a maintenance operation may include any type of data transformation operation. Example database maintenance operations include changing data format, changing data types, backing up the data, and encryption, to name just some examples. Changing the data format may include reducing a number value from 3 decimal places to 2 decimal places. Changing the data type may include changing the values stored from String to Integer. Encryption may include any of performing an initial encryption (e.g., plaintext to encrypted), a decryption (e.g., encrypted to plaintext), or a re-encryption (e.g., in which encrypted data is changed from one key or encryption type to another) operation.

For illustrative purposes, the embodiments described herein focus primarily on the re-encryption (e.g., rotating or changing encryption keys) of a column 2 from table 106. However, it will be understood by persons skilled in the art, that various other types of database administrative and maintenance operations (e.g., that require or include the locking of data) may benefit from the utility provided by DMP 102 as described herein. Further, the utility of DMP 102 may be extended across multiple tables or databases simultaneously.

In an embodiment, DMP 102 may be implemented on computing devices hosting a database, including one or more tables 106 of data. As described above, DMP 102 may be operating in a client-side maintenance/encryption context.

DMP 102 may reduce or even minimize locked data and network bandwidth downtimes, by splitting maintenance operations into smaller tasks that are executed as independent transactions by client 104A, while keeping portions of the data available for other systems or clients 104B, 104C that may be accessing the data of the database, including those tables being modified or maintained.

In an embodiment, the final task of the maintenance operation as described herein may be a metadata change transaction. The metadata change transaction may require temporarily locking the data of a selected table 106, but for a shorter period of time relative to performing the maintenance operations on all of the data at once, thus improving or even maximizing throughput and availability while reducing database downtime and backlogs. In an embodiment, the metadata change may include activating the previously hidden column, and deactivating the previous Col 2, after the name change.

In an embodiment, DMP 102 may receive a request 108 from a client 104A. The request 108 may include a database maintenance request on table 106. The request 108 may identify one or more columns, rows, or other subset of data values from one or more tables 106 on which one or more maintenance operations are to be performed. In an embodiment, request 108 may include an SQL statement from an authorized user's session that triggers a maintenance operation.

As described herein, the request 108 may include a re-encryption request (e.g., a request to rotate the keys 110) of Col 2. Upon receiving request 108, DMP 102 may determine that processing the request requires locking at least a portion of the data of table 106 (such as re-encryption). DMP 102 may then create two hidden columns H1 and H2.

H1 may be a column to store the processed or encrypted (e.g., re-encrypted) values from Column 2 as received from client 104 after performing encryption or other maintenance functions. H2 may be a status or state value indicating the progress of the encryption, decryption, or other maintenance process. In an embodiment, DMP 102 may initially set the values for the rows in both columns H1 and H2 to NULL. H1 and H2 may be created and included as part of table 106 (from which Col 2 is selected), or may be part of another table of a database. However, H1 and H2 may include the same number of rows as there are in the selected Col 2.

In another embodiment, columns H1 and H2 may remain visible to client 104A (but may be hidden to clients 104B, 104C). For example, the permissions associated with H1 and H2 may be updated. This may enable client 104A to drive the encryption process as described herein in coordination with DMP 102. For example, client 104A may request to retrieve a batch 112 and request that columns H1 and H2 are updated by DMP 102.

In an embodiment, DMP 102 may select a subset of the data (i.e., original batch 112) from Col 2 to transmit to client 104 for encryption operations. The size of original batch 112 may be determined based on processing, memory, bandwidth availability, current processing load, and/or the type of maintenance operation to be performed. In the example described here, original batch may include 3 rows (R1-R3). In an embodiment, DMP 102 may select the number of records so as to increase available network bandwidth for transmitting to and/or receiving the data from client 104A.

DMP 102 may lock the data values D1-D3 for rows R1-R3 of Col 2 as included in original batch 112, and transmit original batch 112 to client 104A. Information that may be transmitted as part of original batch 112 may include, but is not limited to, data from Col 2 (and other selected tables or columns), encryption key information (if Col 2 data has been previously encrypted), and hidden column metadata for H1 and/or H2 (e.g., table name, column name, column data type, old and new key identifications, hidden column names, and hidden column data types).

Keys 110 may include encryption keys used for one or more encryption processes. Key 110A may refer to the key for encrypted data of Col 2, and key 110B may refer to the new key to be used to re-encrypt data of Col 2. In an embodiment, the key information 110 may be stored on and retrieved from a separate key server (not shown). Storing key information independently from the values or data of table 106 may help increase security in a system. The keys 110 may be retrieved by DMP 102 and transferred to client 104A, or may be retrieved or received directly by client 104A from a key server.

In an embodiment, DMP 102 may update the value or status of each of the rows included in batch 112 from NULL to FALSE, or may leave the values as NULL. Upon receiving batch 112, client 104 may perform the client-side encryption (or other maintenance) process. While this process is being performed, the data from rows 4-100 of Col 2, may remain accessible to clients 104B and 104C, as only the data included in batch 112 has been temporarily locked (prevented from modification, deletion, and insertion). In an embodiment, clients 104B and 104C may still have read access to the locked data.

Client 104A may decrypt the data of batch 112 using key 110A, encrypt the decrypted data using key 110B, and transmit the encrypted batch 114 back to DMP 102. Upon receiving encrypted batch 114, DMP 102 may store the encrypted values E1-E3 in the corresponding rows of H1. DMP 102 may also update the corresponding statuses for rows R1-R3 from NULL or FALSE to TRUE, to indicate that the rows have been encrypted (e.g., maintained). The data values D1-D3 may then be unlocked, and DMP 102 may select a new set of rows for the next batch 112. This process repeats until the rows of the selected table 106 have been re-encrypted by client 104A.

Figure 2:
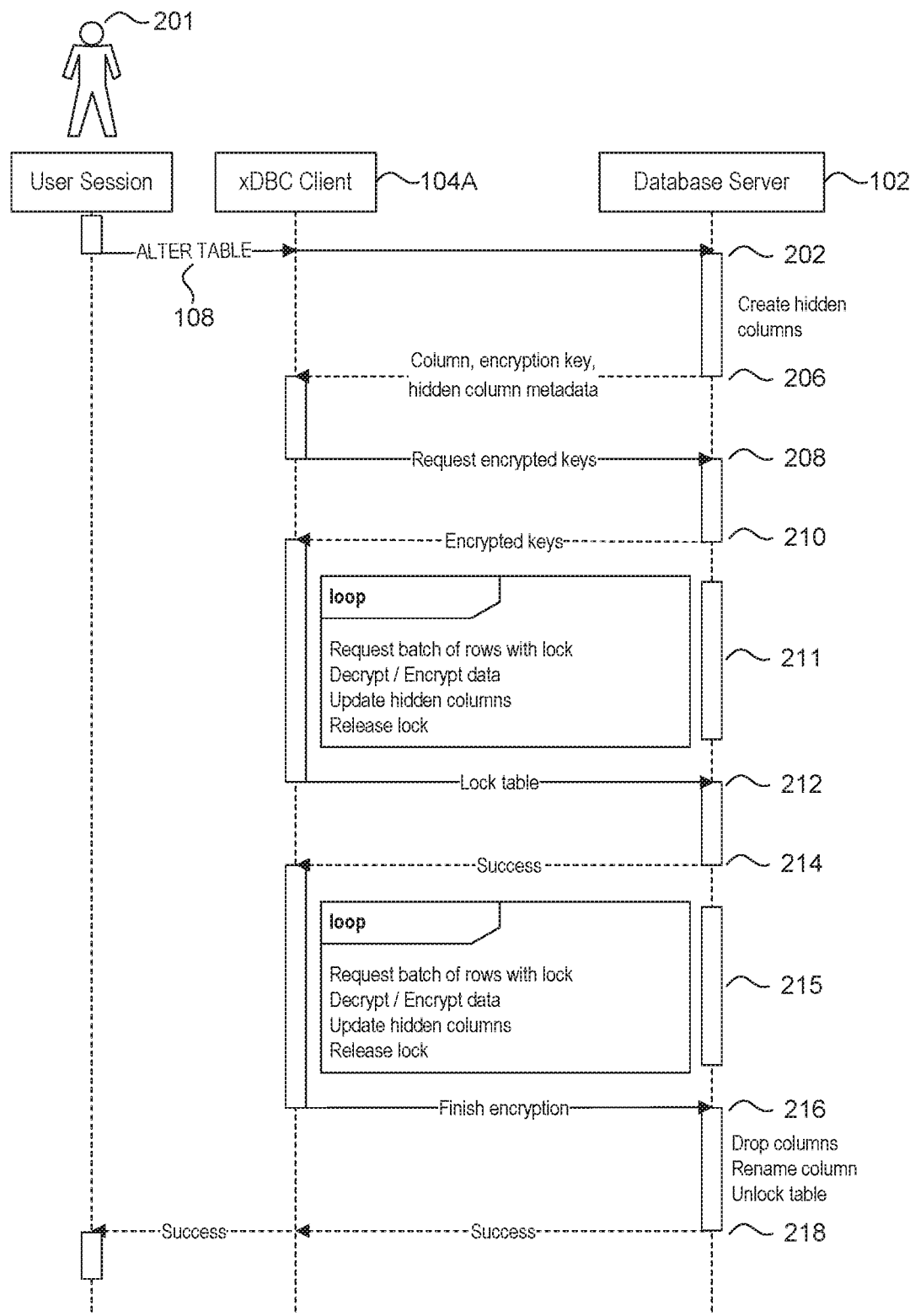
FIG. 2 is a swim diagram illustrating example operations for providing database modification and processing, according to some embodiments.

This process is further illustrated in the swim diagram of FIG. 2. FIG. 2 is a swim diagram 200 illustrating example operations for providing database modification and processing, according to some embodiments. A user session 201 may submit an SQL request 108 to client 104A to encrypt the data of Col 2. At 202, request 108 may be received by DMP 102, and the hidden columns H1 and H2 may be created across one or more tables.

At 206, prior to or with providing an initial batch 112, DMP 102 may provide information such as column data pertaining to the selected Col. 2, encryption key information, and metadata pertaining to the hidden columns H1 and H2. In an embodiment, the hidden columns may be any columns that are not accessible or viewable by clients 104A, 104B, or 104C.

At 208, the client 104A may request encryption key information from DMP 102 or another key server. At 211, DMP 102 may provide the original batch 112, client 104A may perform the encryption functionality, DMP 102 may update H1 with the values, H2 with the status (setting it to TRUE), and release the lock on the values included in the encrypted batch 114 received from client 104A. 211 may continue looping until the values of the selected column(s) have been transmitted and received in batches 112, 114, and their statuses updated from NULL or FALSE to TRUE.

Returning to FIG. 1, as noted above, once E1-E3 have been stored in H1, and the corresponding statuses H2 updated to TRUE, the lock on D1-D3 may be released, while the remaining values of Col 2 are processed. If, during the processing of a subsequent batch 112 of values, a previously processed value (e.g., D1-D3) is modified (e.g., updated or deleted), the status of H2 may be reset from TRUE to FALSE. If any new rows are added, their H2 status values may be set to NULL or FALSE.

As illustrated in the example 214 of FIG. 2, all of the rows of Col. 2 have been processed. In an embodiment, DMP 102 may then lock the entire table (or the data of all the rows of Col. 2). In 215, DMP 102 may identify any rows with a status that has been changed from TRUE to FALSE, or that is NULL. These NULL/FALSE status values may indicate rows that were modified or added during the processing of the maintenance operation. These rows may then be transmitted to client 104 in one or more subsequent batches 112, and when the encrypted batches 114 are received and the values stored in H1, the status information may be updated to TRUE.

At 216, the metadata or name of column H1 may be updated to the name of Col. 2, and Col. 2 may be deleted, removed, made invisible, or dropped. After completing this metadata change, the table 106 may be unlocked once again and the clients 104A-C would have access the updated data previously stored in H1, which has been made accessible as the newly named Col. 2. At 218, the process completes.

Figure 3:
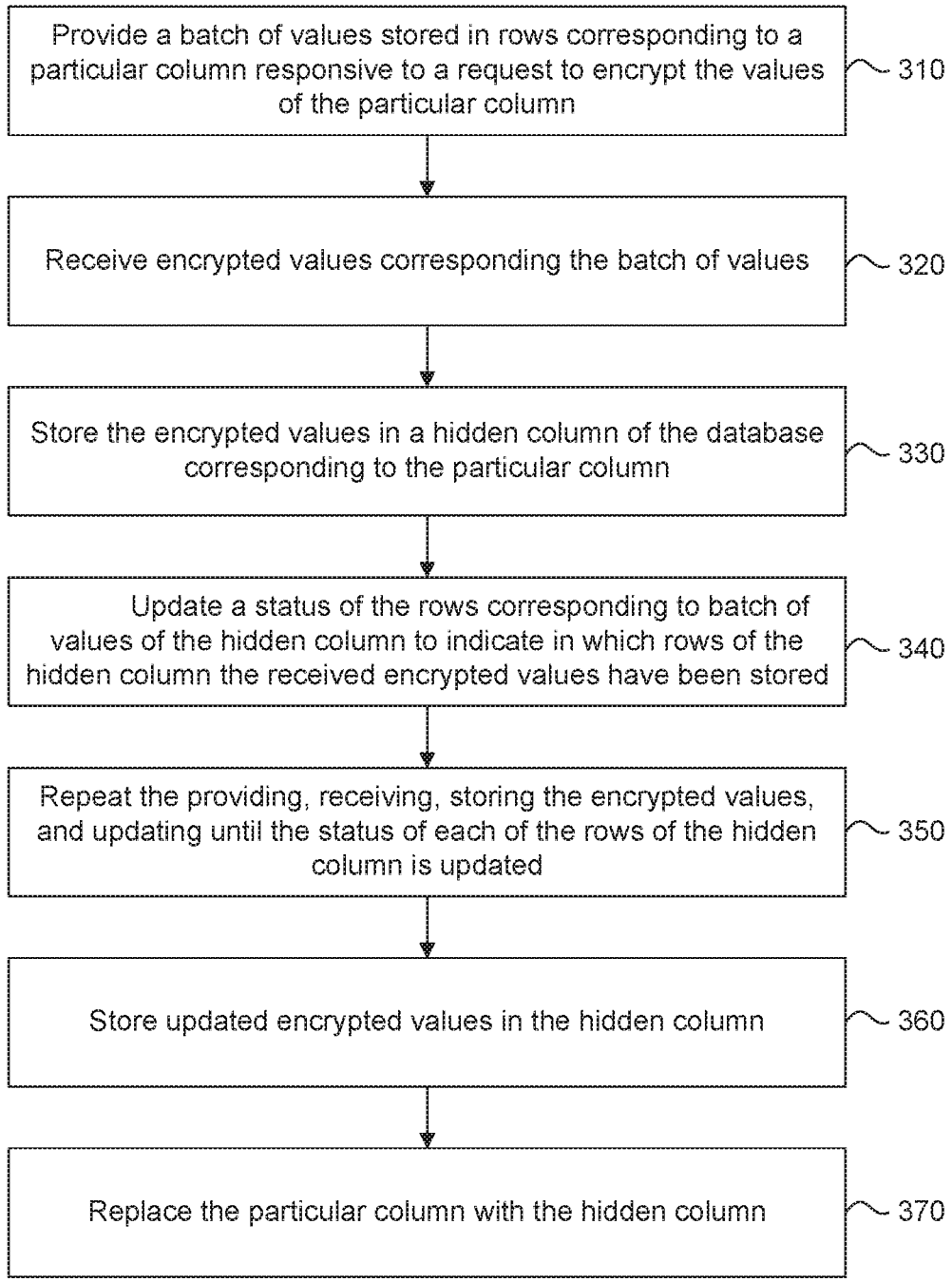
FIG. 3 is a flowchart illustrating example operations for providing database modification and processing, according to some embodiments.

FIG. 3 is a flowchart 300 illustrating example operations for providing database modification and processing, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a batch of values stored in rows corresponding to a particular column is provided in response to a request to encrypt the values of the particular column. For example, DMP 102 may provide original batch 112 of a subset of rows R1-R100 to client 104A, responsive to receiving a maintenance request 108. In an embodiment, batch 112 may include values across multiple columns of multiple tables 106.

In 320, encrypted values corresponding the batch of values are received. For example, DMP 102 may receive encrypted batch 114 with corresponding encrypted values E1-E3.

In 330, the encrypted values are stored in corresponding rows of a hidden column of the database. For example, DMP 102 may store the encrypted values E1-E3 in a hidden column H1.

In 340, a status of the rows corresponding to batch of values of the hidden column is updated to indicate in which rows of the hidden column the received encrypted values have been stored. For example, DMP 102 may update the status column (which may also be a hidden column) H2 to indicate the encrypted values Ex have been stored in the respective rows. In another embodiment, the hidden columns H1, H2 may be visible but locked from access by any clients 104A-C.

In 350, the operations of providing, receiving, storing the encrypted values, and updating the status of encrypted rows are repeated until the status of each of the rows of the hidden column is updated. For example, DMP 102 may continue transmitting batches 112 in response to receiving encrypted batches 114, until all of the rows of values of the selected column Col 2 have been processed.

In 360, updated encrypted values are stored in the hidden column, wherein the updated encrypted values correspond to each of one or more values from one or more rows of the particular column that were updated after a corresponding status of the one or more rows was updated. For example, for any data values D1-D100 that were updated after corresponding encrypted values Ex were stored in H1, for which the status is either NULL or FALSE, one or more additional batches 112 may be transmit to client 104A. During this time, DMP 102 may lock table 106. The updated encrypted values 114 may be received, stored in the corresponding rows of H1 and the H2 status may be updated to TRUE.

In 370, the particular column is replaced with the hidden column, wherein after such replacement, the encrypted values of the hidden column are accessible in the database and the values of the particular column are no longer accessible. For example, once H2 indicates TRUE for the rows or data values affected by the maintenance operation, the name and metadata of H1 may be updated to replace Col 2, and Col. 2 may be hidden or removed. Also, the table 106 may be unlocked and clients 104A-C may then have access to the encrypted values that are now stored in Col 2.

Figure 4:
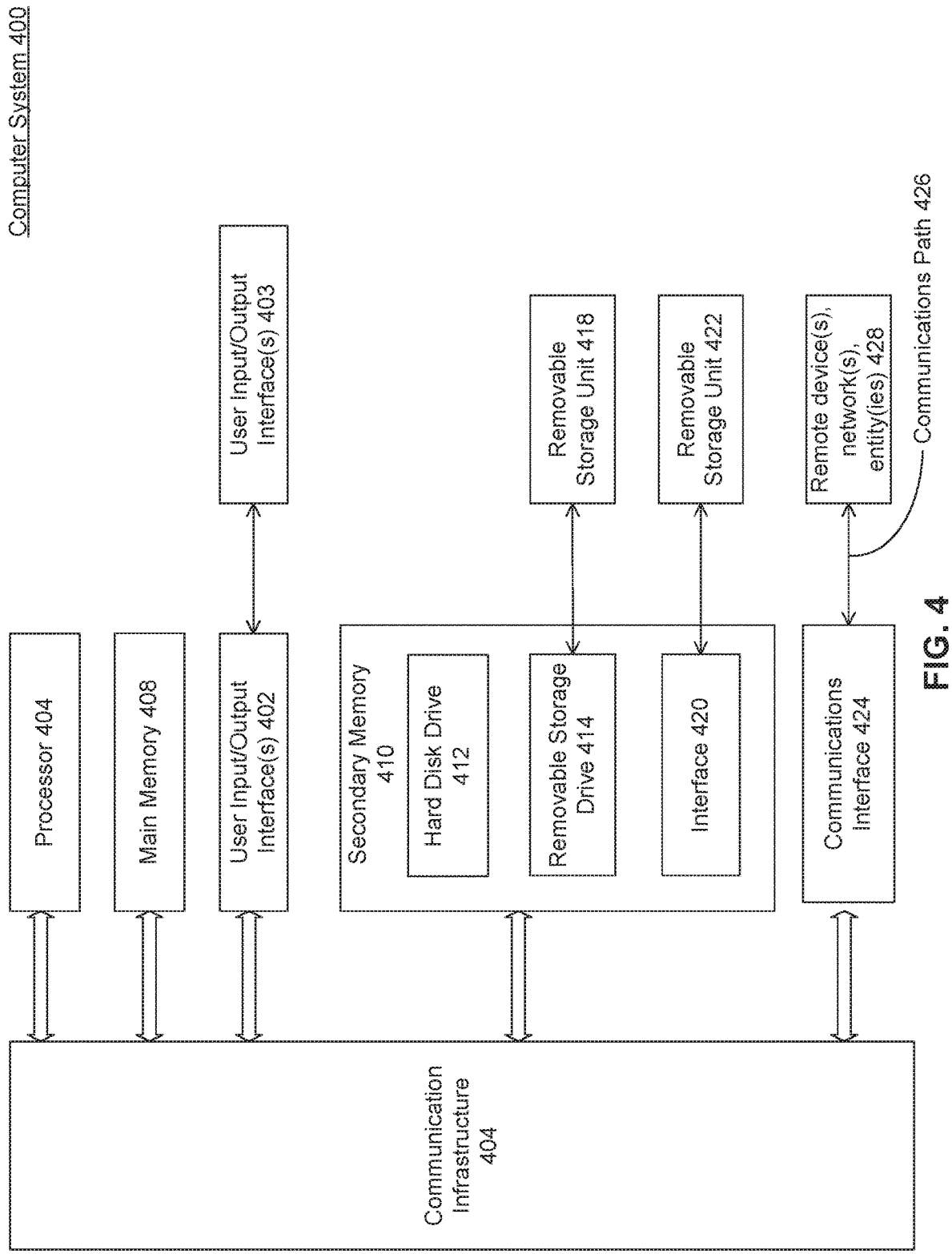
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:

receiving a request to re-encrypt a column of a table, the column comprising a plurality of rows;

creating both a first hidden column and a second hidden column responsive to the request as part of a different table of the database, wherein both the first hidden column and the second hidden column include a same number of rows as the column of the table, wherein the first hidden column stores a status, wherein an initial status of the first hidden column is set to NULL indicating that the corresponding data from the column has not been processed;

selecting a batch of values across a subset of the rows of the column of the table;

providing the batch of values stored in a corresponding set of rows from the plurality of rows to a client to perform the re-encryption responsive to the request to re-encrypt the column of the table;

updating the status of a subset of rows of the first hidden column, corresponding to the set of rows, from NULL to FALSE indicating which values were included in the batch;

receiving encrypted values corresponding to the batch of values;

storing the encrypted values received from the client in the second hidden column;

updating the status of the subset of rows of the first hidden column from FALSE to TRUE indicating in which rows of the second hidden column the received encrypted values have been stored;

repeating the providing, receiving, storing the encrypted values, and updating the status until the status of each of the rows of the hidden column is updated to TRUE;

determining that the status of a first row of the subset of rows that was previously updated to TRUE, has been updated back to FALSE;

locking the table responsive to determining that the status of the first row has been updated back to FALSE, providing a subsequent batch including the first row to the client to perform re-encryption;

receiving an updated encrypted value for the first row;

storing updated encrypted values in the second hidden column including the updated encrypted value for the first row, wherein the updated encrypted values correspond to each of one or more values from one or more rows of the column of the table that were updated after a corresponding status of the one or more rows was updated;

replacing the column of the table with the second hidden column, wherein after the replacing, the encrypted values of the second hidden column are accessible in the database and the values of the column of the table are no longer accessible; and unlocking the table.

2. The method of claim 1, wherein the providing comprises:

locking the rows of the column corresponding to the batch of values, wherein a remainder of the database remains accessible.

3. The method of claim 2, wherein the storing the encrypted values comprises: unlocking the locked rows.

4. The method of claim 1, wherein the storing the updated encrypted values comprises:

determining which of the rows indicate a status that an encrypted value for the hidden column has not been received;

providing a second batch of values corresponding to the determined rows; and receiving the updated encrypted values for the second batch of values.

5. The method of claim 4, wherein the FALSE status indicates that the encrypted value for the hidden column has not been received, wherein the TRUE status indicates that a value of a particular column was updated.

6. The method of claim 4, wherein the NULL status indicates that a new value for a new row of the particular column was added.

7. The method of claim 4, wherein the determining which of the rows comprises:

locking the database during the determining, the providing the second batch, the receiving, and the storing updated encrypted values.

8. The method of claim 1, wherein the replacing comprises:

renaming the second hidden column with a name of a particular column;

activating the second hidden column; and deactivating the particular column after the activating.

9. The method of claim 8, further comprising:

deleting the first hidden column.

10. The method of claim 1, further comprising:

identifying one or more rows for which a value was modified during the repeating based on the status of the one or more rows in the first hidden column; and re-sending values corresponding to the identified one or more rows to the client for re-encryption prior the replacing.

11. The method of claim 1, wherein the determining that the status of a first row of the subset of rows that was previously updated to the second status, has been updated back to the first status comprises:

determining that the status of a first plurality of rows of the subset of rows that were previously updated to the second status, have been updated back to the first status; and wherein the providing a subsequent batch including the first row comprises providing a plurality of subsequent batches to the client for re-encryption, wherein each of the plurality of subsequent batches includes one or more of the first plurality of rows.

12. The method of claim 1, further comprising:

updating the FALSE back to TRUE for the first row responsive to receiving the updated encrypted value for the first row.

13. A system comprising:

a memory; and at least one processor coupled to the memory and configured to:

receive a request to re-encrypt a column of a table, the column comprising a plurality of rows;

create both a first hidden column and a second hidden column responsive to the request as part of a different table of the database, wherein both the first hidden column and the second hidden column include a same number of rows as the column of the table, wherein the first hidden column stores a status, wherein an initial status of the first hidden column is set to NULL indicating that the corresponding data from the column has not been processed;

select a batch of values across a subset of the rows of the column of the table;

provide the batch of values stored in a corresponding set of rows from the plurality of rows to a client to perform the re-encryption responsive to the request to re-encrypt the column of the table;

update the status of a subset of rows of the first hidden column, corresponding to the set of rows, from NULL to FALSE indicating which values were included in the batch;

receive encrypted values corresponding the batch of values;

store the encrypted values received from the client in the second hidden column;

update the status of the subset of rows of the first hidden column from FALSE to TRUE indicating in which rows of the second hidden column the received encrypted values have been stored;

repeat the providing, receiving, storing the encrypted values, and updating the status until the status of each of the rows of the hidden column is updated;

determine that the status of a first row of the subset of rows that was previously updated to TRUE, has been updated back to FALSE;

lock the table responsive to determining that the status of the first row has been updated back to FALSE;

provide a subsequent batch including the first row to the client to perform re-encryption;

receive an updated encrypted value for the first row;

store updated encrypted values in the second hidden column including the updated encrypted value for the first row, wherein the updated encrypted values correspond to each of one or more values from one or more rows of the column of the table that were updated after a corresponding status of the one or more rows was updated;

replace the column of the table with the second hidden column, wherein after the replacing, the encrypted values of the second hidden column are accessible in the database and the values of the column of the table are no longer accessible; and unlock the table.

14. The system of claim 13, wherein the at least one processor that provides is configured to:

lock the rows of the column corresponding to the batch of values, wherein a remainder of the database remains accessible.

15. The system of claim 14, wherein the at least one processor that stores the encrypted values is configured to:

unlock the locked rows.

16. The system of claim 13, wherein the at least one processor that stores the updated encrypted values is configured to:

determine which of the rows indicate a status that an encrypted value for the hidden column has not been received;

provide a second batch of values corresponding to the determined rows; and receive the updated encrypted values for the second batch of values.

17. The system of claim 16, wherein the FALSE status indicates that the encrypted value for the hidden column has not been received, wherein the TRUE status indicates that a value of a particular column was updated.

18. The system of claim 16, wherein the NULL status indicates that a new value for a new row of the particular column was added.

19. The system of claim 16, wherein the at least one processor that determines which of the rows is configured to:

lock the database during the determining, the providing the second batch, the receiving, and the storing updated encrypted values.

20. A non-transitory computer-readable device having instructions stored thereon that, when executed by at least one computing device, cause the at least one computing device to perform operations comprising:

receiving a request to re-encrypt a column of a table, the column comprising a plurality of rows;

creating both a first hidden column and a second hidden column responsive to the request as part of a different table of the database, wherein both the first hidden column and the second hidden column include a same number of rows as the column of the table, wherein the first hidden column stores a status, wherein an initial status of the first hidden column is set to NULL indicating that the corresponding data from the column has not been processed;

selecting a batch of values across a subset of the rows of the column of the table;

providing the batch of values stored in a corresponding set of rows from the plurality of rows to a client to perform the re-encryption responsive to the request to re-encrypt the column of the table;

updating the status of a subset of rows of the first hidden column, corresponding to the set of rows, from NULL to FALSE indicating which values were included in the batch;

receiving encrypted values corresponding to the batch of values;

storing the encrypted values received from the client in the second hidden column;

updating the status of the subset of rows of the first hidden column from FALSE to TRUE indicating in which rows of the second hidden column the received encrypted values have been stored;

repeating the providing, receiving, storing the encrypted values, and updating the status until the status of each of the rows of the hidden column is updated to TRUE;

determining that the status of a first row of the subset of rows that was previously updated to TRUE, has been updated back to FALSE;

locking the table responsive to determining that the status of the first row has been updated back to FALSE;

providing a subsequent batch including the first row to the client to perform re-encryption;

receiving an updated encrypted value for the first row;

storing updated encrypted values in the second hidden column including the updated encrypted value for the first row, wherein the updated encrypted values correspond to each of one or more values from one or more rows of the column of the table that were updated after a corresponding status of the one or more rows was updated;

replacing the column of the table with the second hidden column, wherein after the replacing, the encrypted values of the second hidden column are accessible in the database and the values of the column of the table are no longer accessible; and unlocking the table.

* * * * *